United States Patent [19]

Nestell

[11] Patent Number: 4,634,196
[45] Date of Patent: Jan. 6, 1987

[54] VISOR MOUNTING BRACKET
[75] Inventor: David E. Nestell, Wyoming, Mich.
[73] Assignees: Prince Corporation, Holland, Mich.; David E. Nestell, Wyoming, Mich.
[21] Appl. No.: 579,084
[22] Filed: Feb. 10, 1984
[51] Int. Cl.[4] .............................. H01R 39/00
[52] U.S. Cl. ...................... 339/5 R; 403/329
[58] Field of Search ............. 339/10, 8, 5, 182 R; 296/1 R, 1 C, 1 H, 1 J, 1 K; 403/329

[56] References Cited

U.S. PATENT DOCUMENTS

| | | | |
|---|---|---|---|
| 2,110,120 | 3/1938 | Ball | 296/97 K |
| 2,357,974 | 9/1944 | Roberts | 296/97 K |
| 2,570,739 | 8/1950 | Shaw | 403/329 X |
| 2,939,741 | 6/1960 | Keating et al. | 296/97 K |
| 3,150,896 | 9/1964 | Plattner | 296/97 K |
| 3,767,256 | 10/1973 | Sarkees | 296/97 K |
| 3,954,311 | 5/1976 | Pike | 384/439 |
| 4,023,856 | 5/1977 | DeRees | 296/97 R |
| 4,352,518 | 10/1982 | Prince et al. | 296/97 H |
| 4,363,511 | 12/1982 | Viertel et al. | 296/97 K |
| 4,553,797 | 11/1985 | Marcus | 339/5 R X |

FOREIGN PATENT DOCUMENTS

| | | |
|---|---|---|
| 1965143 | 12/1969 | Fed. Rep. of Germany . |
| 7415154 | 8/1974 | Fed. Rep. of Germany . |
| 2341940 | 10/1977 | Fed. Rep. of Germany . |
| 7531982 | 3/1982 | Fed. Rep. of Germany . |
| 2351300 | 12/1977 | France ............ 403/329 |
| 1251479 | 10/1971 | United Kingdom . |

Primary Examiner—Eugene F. Desmond
Attorney, Agent, or Firm—Price, Heneveld, Huizenga & Cooper

[57] ABSTRACT

A locking mechanism for mounting a visor rod to a vehicle includes a housing with a keyed aperture within a cylindrical portion for receiving a visor rod end therein. The rod end includes a keyed torque fitting having a radially extending flat with the housing including a recess holding a spring which extends radially inwardly for engaging the flat of the torque fitting when the rod is inserted into the housing for holding the rod end in the housing.

5 Claims, 5 Drawing Figures

VISOR MOUNTING BRACKET

BACKGROUND OF THE INVENTION

The present invention relates to a mounting bracket, and particularly one for mounting a visor support rod to a vehicle.

Visor rods typically employed for mounting visors to a vehicle are mounted to the roof of a vehicle by a bracket and elbow assembly in which the elbow is pivotally mounted to the bracket by a shaft extending through an opening in the bracket and secured thereto by a backing washer and spring. U.S. Pat. No. 4,075,468 discloses such a structure. Recently, efforts have been made to improve on this construction and copending U.S. patent application, Ser. No. 341,284, filed on Jan. 21, 1982, now U.S. Pat. No. 4,553,797, and entitled MOUNTING BRACKET discloses a system in which a snap-in mounting bracket is provided for the end of a visor mounting rod which snaps and locks into position. This structure also includes electrical contacts for use in supplying power to an illuminated, visor mounted vanity mirror, in a preferred embodiment.

SUMMARY OF THE PRESENT INVENTION

The system of the present invention provides an improved mechanism for mounting a visor rod to a vehicle and includes, in the preferred embodiment, a housing integrally including a cylindrical opening for receiving a visor rod with the housing adapted to be mounted to a vehicle headliner. The housing includes a recess for holding a retaining spring adjacent the opening with the spring extending across a chordal segment of the opening to engage a visor rod end inserted into the housing and hold the rod into the housing. The spring of the preferred embodiment extends tangentially across one edge of the aperture and moves toward and away from the longitudinal axis of the opening to provide a compressive holding force against the visor rod immediately adjacent and below a radially extending flat formed on the visor rod end.

This construction provides a very strong and durable mounting system for a visor and one which facilitates assembly and installation in a vehicle.

These and other features, objects and advantages of the present invention will become apparent upon reading the following description thereof together with reference to the accompanying drawings in which:

DETAILED DESCRIPTION OF THE PREFERRED EMBODIMENT

Figure 1:
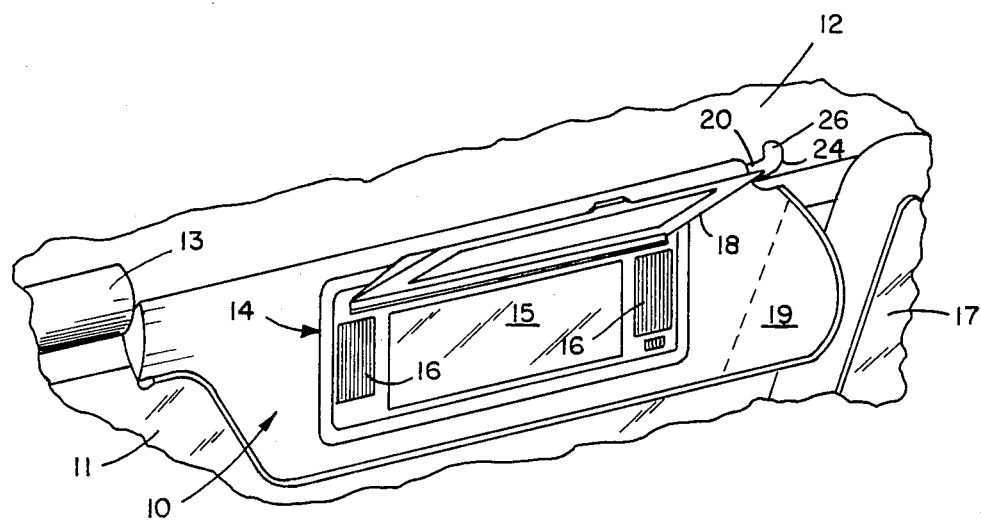
FIG. 1 is a fragmentary, perspective view of an illuminated vanity mirror visor assembly incorporating the mounting structure of the present invention.

Referring initially to FIG. 1, there is illustrated an illuminated visor assembly 10 mounted to the headliner 12 of a vehicle employing the structure of the preferred embodiment of the invention. The visor is pivoted to a lowered position with respect to the windshield 11 of the vehicle, as illustrated in FIG. 1, and includes a covered illuminated vanity mirror assembly 14 which can be of the type described in U.S. Pat. No. 4,227,241, the disclosure of which is incorporated herein by reference. Assembly 14 includes a mirror 15 spanned on either side by illumination means 16 which include lenses and electrical lamps mounted behind them to which electrical power is selectively applied for illuminating the area in front of the mirror. Electrical conductors for applying such power are coupled to the vehicle's electrical supply system through the mounting bracket assembly of the present invention.

The illuminated mirror assembly 14 further includes a cover 18 for selectively covering the mirror when not in use and for actuating the lamp means within the light sources. Although the mounting bracket of the preferred embodiment of the invention specifically illustrates the provision of electrical contacts for supplying electrical power to the illuminated mirror subassembly 14, in other embodiments of the invention, the mounting bracket can be used with standard visors with or without vanity mirrors.

The visor assembly 10 includes a visor rod 20 which extends within the body 19 of the visor along the top edge thereof, as illustrated in FIG. 1, and is held within the visor by means of a torque fitting, such as that disclosed in U.S. patent application Ser. No. 392,534, filed June 28, 1982, now U.S. Pat. No. 4,500,131, entitled VISOR CONTROL and assigned to the present assignee. The visor body 19 thus can pivot about rod 20 between a lowered use position, as illustrated in FIG. 1, and an upper raised position against the headliner 12 of the vehicle when not in use. The end of the visor body 19 remote from rod 20 includes an outwardly extending stub axle (not shown) which fits within a bracket 13 for removably holding the visor along the top edge of the windshield or permitting its removal from bracket 13 for pivoting about the bracket assembly of the present invention to a side window 17 of the vehicle.

Figures 2, 3:
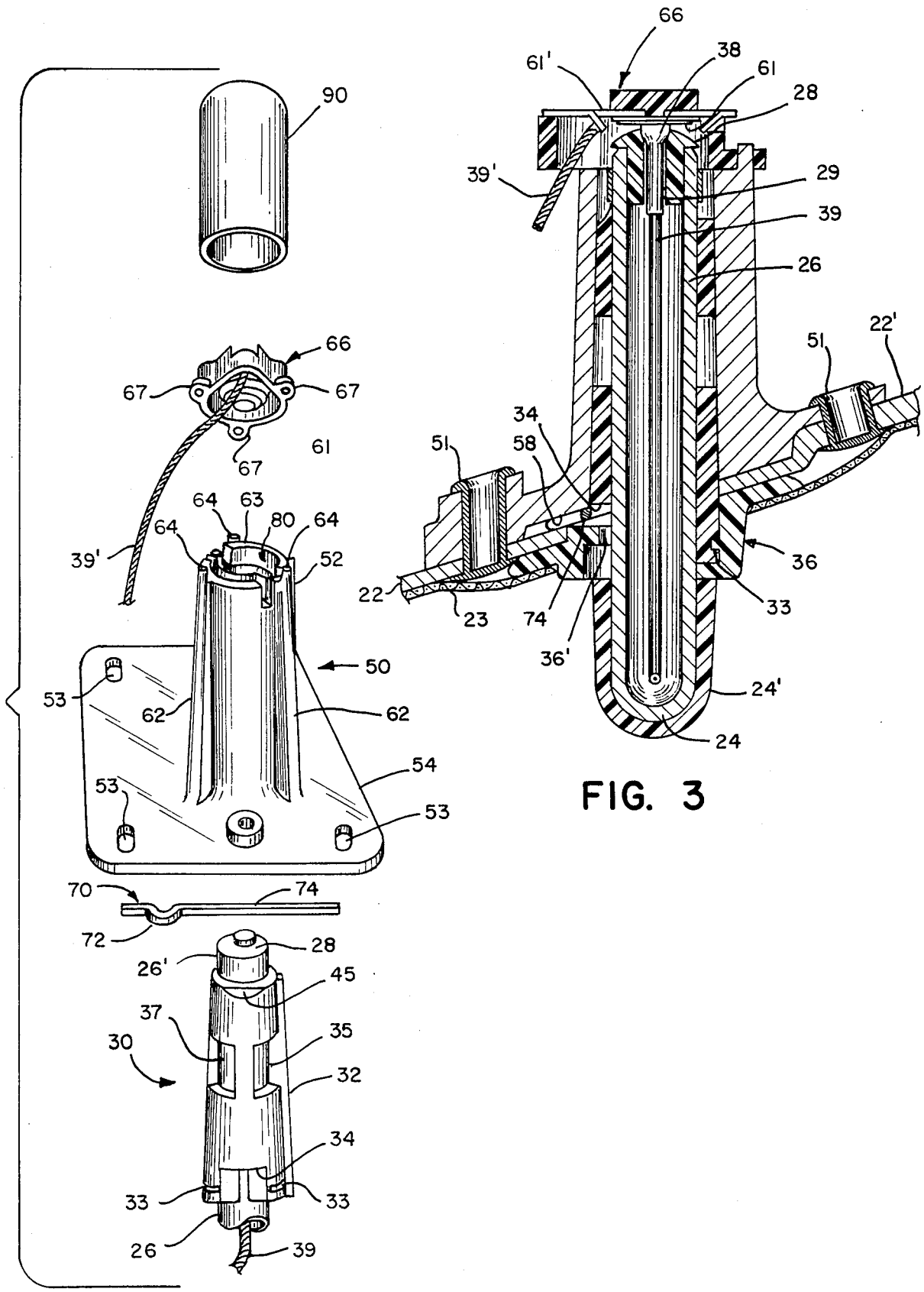
FIG. 2 is a fragmentary, exploded, perspective view of the visor rod end mounting structure of the present invention.
FIG. 3 is an enlarged, vertical, cross-sectional view of the structure of FIG. 2 shown assembled and mounted in a vehicle.

The headliner, in the preferred embodiment of the invention, is a molded upholstered panel made of a fiber board-like material 22 (FIG. 3) covered by a suitable upholstery fabric 23 to conform the headliner to the vehicle's interior upholstery. In the preferred embodiment, the headliner panel 12 assembly includes driver and passenger visor assemblies 10, brackets 13 and a digital compass and garage door opening module positioned between the visors and of the type described in U.S. patent application Ser. No. 478,364, filed Mar. 24, 1983, now U.S. Pat. No. 4,546,551, entitled ELECTRICAL CONTROL SYSTEM. The visor rod 20 to which the visor is pivotally mounted includes a generally right angle elbow 24 having an end 26 extending in a direction generally orthogonal to its opposite end which extends within the visor body 19. The visor rod is generally a tubular member made of steel or other conductive material. End 26, as best seen in FIG. 2, includes a polymeric torque fitting 30 integrally molded thereon for allowing the rod 26 to rotate within the torque fitting 30 which, in turn, is anchored within a housing 50 defining a socket for the rod end 26 and associated torque fitting 30. A description of the torque fitting and rod end follows with a subsequent description of the housing defining the socket for receiving the snap-in visor rod.

The torque fitting 30 is integrally molded to the end 26 of visor rod 20 and comprises a polymeric material such as acetal and particularly acetal homopolymer such as DELRIN 500DK602 which provides the desired characteristics for this application. Other polymeric material, however, having a shrinkage of from 0.020 to 0.025 inches per linear inch to compressibly engage the cylindrical rod end 26 and which upon cooling will not set up against the rod thereby providing the desired breakaway torque could also be employed. The desired properties of such materials is set forth in greater detail in the Modern Plastic Encyclopedia, McGraw-Hill, New York, Volume 54, No. 1080, 1977-1978, page 8, the disclosure of which is incorporated herein by reference.

The torque fitting 30, in the preferred embodiment, is generally cylindrical having a rectangular cross section axially extending flange 32 shaped to fit within a keyway 55 (FIG. 5) of socket 50. As best seen in FIG. 2, fitting 30 also includes a flat 34 formed by molding a notch in the sidewall of the fitting. Flat 34 extends horizontally and is orthogonal to the axis of fitting 30 and encompasses a cordal segment of the cylindrical torque fitting. It thus defines a generally radially extending (from the axis of rod end 26) flat surface engaged by the retainer spring 70, also shown in FIG. 2, to hold the visor rod end and visor 10 in a locked-in position within socket 50. Fitting 30 also includes circumferential slits 33 for receiving a configured resilient polymeric bezel member 36 (FIG. 3) when assembled. Fitting 30 may also be relieved at areas 35 for saving of material and if desired, for modifying the torque characteristics of the fitting with respect to the rod.

The end of the hollow rod 26 terminates in an elongated insulator insert 28 which, as best seen in FIG. 3, has a cylindrical sidewall which compressibly fits within the inner cylindrical surface of rod end 26 and has a cylindrical aperture 29 extending centrally therein for receiving an electrical contact 38. The electrical contact is a button-type contact to which an electrical conductor 39 is electrically coupled either by soldering or crimping. Conductor 39 extends through the elbow 24 of the visor rod 20 into the visor body 19 for supplying operating power and particularly positive voltage power to the electrical lamps of the visor. The ground connection for the electrical circuit is supplied by the metallic visor rod 20 itself and its connection by a slip ring contact 80, described below, which is mounted to the cast aluminum socket 50 which in turn is suitably grounded to the vehicle.

Figure 5:
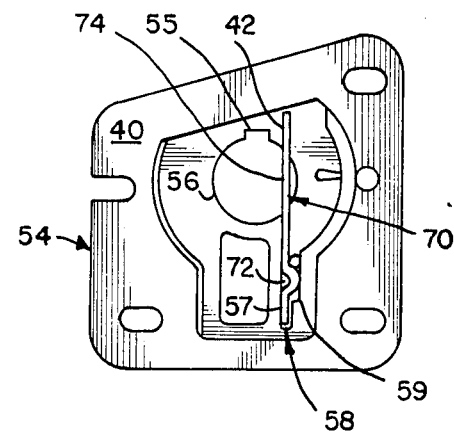
FIG. 5 is a reduced, bottom plan view of the housing shown in FIG. 4.

The housing or socket 50 comprises a generally cylindrical collar section 52 integrally formed with a generally rectangular base flange 54 having a plurality of apertures 53 for securing the flange 54 to the preformed headliner 22, as illustrated in FIG. 3. Fastening means such as rivets 51 are employed for securing the flange 54 to the headliner through a suitable aperture permitting collar 52 to extend upwardly therethrough. The collar includes an internal cylindrical opening having a keyway 55, as best seen in FIG. 5, for receiving flange 32 of the torque fitting 30 and locking the torque fitting against relative rotation within the housing. The collar portion is inclined as necessary with respect to the planar flange to align the visor rod as desired when installed in a vehicle. The slope of the headliner in a given vehicle will in large part determine the angle of inclination. The bottom surface 40 of flange 54 includes a configurated recess 58 having a narrow, rectangular portion 57 and an enlarged, rectangular portion 59 for receiving and holding spring 70 and preventing the spring from moving in a direction along its axis. Thus, the curved segment 72 of the spring is locked within the rectangular recess 58 on the lower surface of flange 54 holding the spring in position. The elongated leg 74 of the spring 70 extends across a chordal segment of the circular opening 56 of socket 50 and compressibly abuts against a land 42, as shown in FIG. 5, prior to the installation of the torque fitting 30.

Collar 50 includes three integral reinforcing ribs 62 extending longitudinally at 120 degree spaced intervals on the exterior thereof and integrally joins the collar and flange 54. These ribs terminate at their upper ends in cylindrical posts 64 which receive and support thereon an insulated contact cap 66 having three tabs 67 with apertures therein which extend over and circumscribe posts 64. Cap 66 includes a spiral spring electrical contact 61 which engages contact 38 associated with rod end 26 and to which conductor 39' extends and is electrically coupled by a backing conductive disc 61'. Conductor 39' extends above (i.e., behind) the headliner 22 to a positive supply of vehicle operating potential. Contact 61 is a spiral spring similar to that employed in a small flashlight to assure a positive connection between contact 38 and contact 61.

Figure 4:
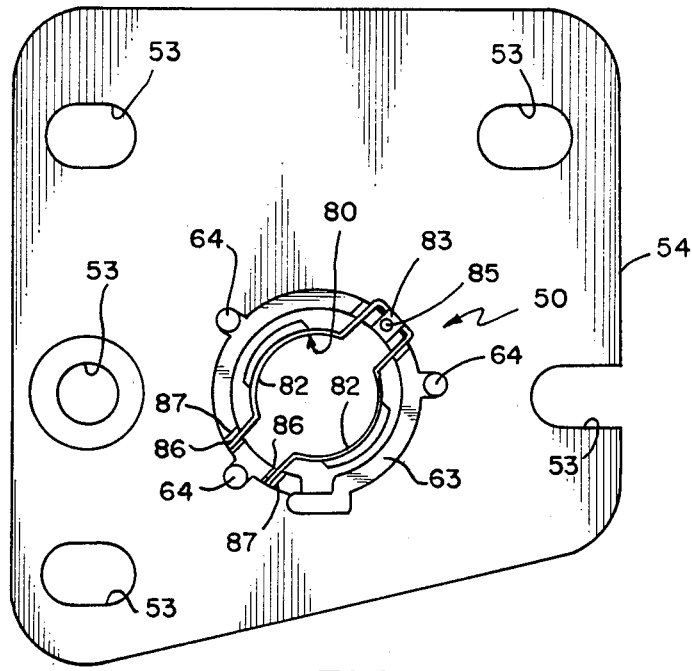
FIG. 4 is an enlarged, top plan view of the housing shown in FIG. 2 but rotated clockwise 90 degrees as viewed from the top.

The negative or grounding side of the power supplied to the illuminated vanity mirror assembly 14 is provided by a slip ring contact 80, best seen in FIG. 4, which includes a pair of generally arcuate legs 82 integrally joined at one end and with a tab 83 formed at right angles thereto and staked to a post 85 extending from the top surface 63 of collar 52. The free ends 86 of contacts 80 extend within a pair of slots 87 formed downwardly on the top surface of the collar to allow some spring action opening of the wiper-type contacts such that the tip end 26' (FIG. 2) of the visor rod end 26 can be pushed upwardly and force legs 82 outwardly slightly and in compressive contact with the visor rod, as seen in FIG. 3. A protective rubberized cup-shaped cover 90 (shown only in FIG. 2) is fitted over the assembly including socket 50 and cap 66 prior to installation on the vehicle.

Installation is achieved by laying spring 70 in its configurated recess 58 in the bottom surface of flange 54 and resting the assembly on the upper surface 22' of the fiberboard 22 forming the headliner. When so positioned, the top surface 22' of the fiberboard holds spring 70 vertically within the configurated recess 58, as best seen in FIG. 3. Fastening means such as rivets 51 or the like are then employed to secure the socket 50 in position and covering fabric 23 subsequently applied. A visor can be installed subsequently by urging the end 26 of the visor rod into exposed opening 56 with the flange 32 of the torque fitting 30 aligned with keyway 55. A tapered camming surface 45 (FIG. 2) on the end of torque fitting 30 urges the end 74 of spring 70 outwardly until it rides along the cylindrical sidewall of the torque fitting 30 and reaches the flat 34. The spring then snaps into the position shown in FIG. 5 with the flat 34 positioned immediately adjacent and above the spring. The spring prevents fitting 30 and the visor rod to which it is attached from backing out of opening 56 and provides axial alignment of the visor rod end. The contact tip of the rod engages the top of housing 50 with contacts 38 and 61 being securely made. A slot 36' is provided in the bezel 36 to permit removal of the visor by an elongated tool permitting the spring leg 74 to be deflected away from flat 34 if removal is necessary. A decorative end cap 24' (FIG. 3) can also be fitted over the elbow 24 of the visor rod if desired.

The torque fitting of the preferred embodiment of the invention has an axial length of 1.4 inches and surrounds the visor rod with an outer diameter of ⅜ inches. Flat 34 provides not only the retaining surface for snap-locking the visor to the headliner mounted socket, but also is axially positioned to assure firm engagement and alignment of the electrical contacts on the rod end with the electrical contacts in socket 50. Spring 70, in the preferred embodiment, was made of spring steel having a square cross section with each side being 3/64 of an inch. The contact for the spring arm 74 is approximately 2,000 pounds per inch.

It will become apparent to those skilled in the art that various modifications to the preferred embodiment of the invention as described herein can be made without departing from the spirit or scope thereof as defined by the appended claims.

The embodiments of the invention in which an exclusive property or privilege is claimed are defined as follows.

1. A snap-in visor mounting system comprising:
    a socket defined by a generally cylindrical collar with an internal longitudinally extending keyway for receiving a visor rod therein, said socket further including integral flange means extending radially outwardly from an open end of said collar for mounting said socket to a vehicle with one side of said flange adjacent said collar facing upwardly, said flange including a spring receiving recess formed therein in a side opposite said one side;
    a spring removably mounted within a recess of said flange and including a leg extending across a chordal segment of the opening of said socket, said spring deflectable to urge against a visor rod when inserted in said socket for holding the rod within said socket;
    holding means secured to said flange and engaging a side of said spring opposite said flange for holding said spring within the said recess wherein said holding means comprises a cover member extending at least over said spring receiving recess for holding said spring within said recess; and
    a visor mounting rod with an end shaped to extend into said opening of said socket and having an axially extending surface positioned such that said spring engages said surface for holding said rod within said housing and wherein said mounting rod includes a molded-on torque fitting with a longitudinally extending flange which extends into said longitudinally extending keyway for preventing rotation of said torque fitting within said socket.

2. The apparatus as defined in claim 1 wherein said socket and said rod include electrical contact means which engage when said rod is mounted within said socket.

3. The apparatus as defined in claim 2 wherein said mounting rod is formed of a hollow, electrically conductive tube and includes an electrical contact at an end inserted into said socket and insulator means spacing said contact from said tube, and conductor means extending within said tube and coupled to said contact.

4. The apparatus as defined in claim 3 wherein said socket is made of a conductive material and includes a slip ring contact engaging said mounting rod and an end contact, and insulator means positioning said end contact in insulative relationship to said socket and positioned to engage said contact of said mounting rod.

5. A visor mounting system for a vehicle comprising:
    a socket defined by a generally cylindrical collar with an internal, longitudinally extending keyway for receiving a visor rod therein, said socket further including flange means extending radially outwardly from an open end of said collar for mounting said socket to a vehicle, said flange including an upper surface facing the roof of a vehicle and an opposite surface facing generally downwardly, a spring receiving recess formed in said opposite surface of said flange;
    a spring removably mounted within said recess of said flange and including a leg extending across a chordal segment of the opening of said socket, said spring deflectable to urge against a visor rod when inserted in said socket for holding the rod within said socket;
    a vehicle headliner panel including a portion engaging said opposite surface of said flange for covering said spring within said spring receiving recess; and
    a visor mounting rod having a molded-on torque fitting at an end and shaped to releasably and lockably engage said socket and spring for holding said rod within said socket.

* * * * *